(No Model.) 3 Sheets—Sheet 1.
G. BEEKMAN.
REAPING OR MOWING MACHINE.
No. 535,883. Patented Mar. 19, 1895.
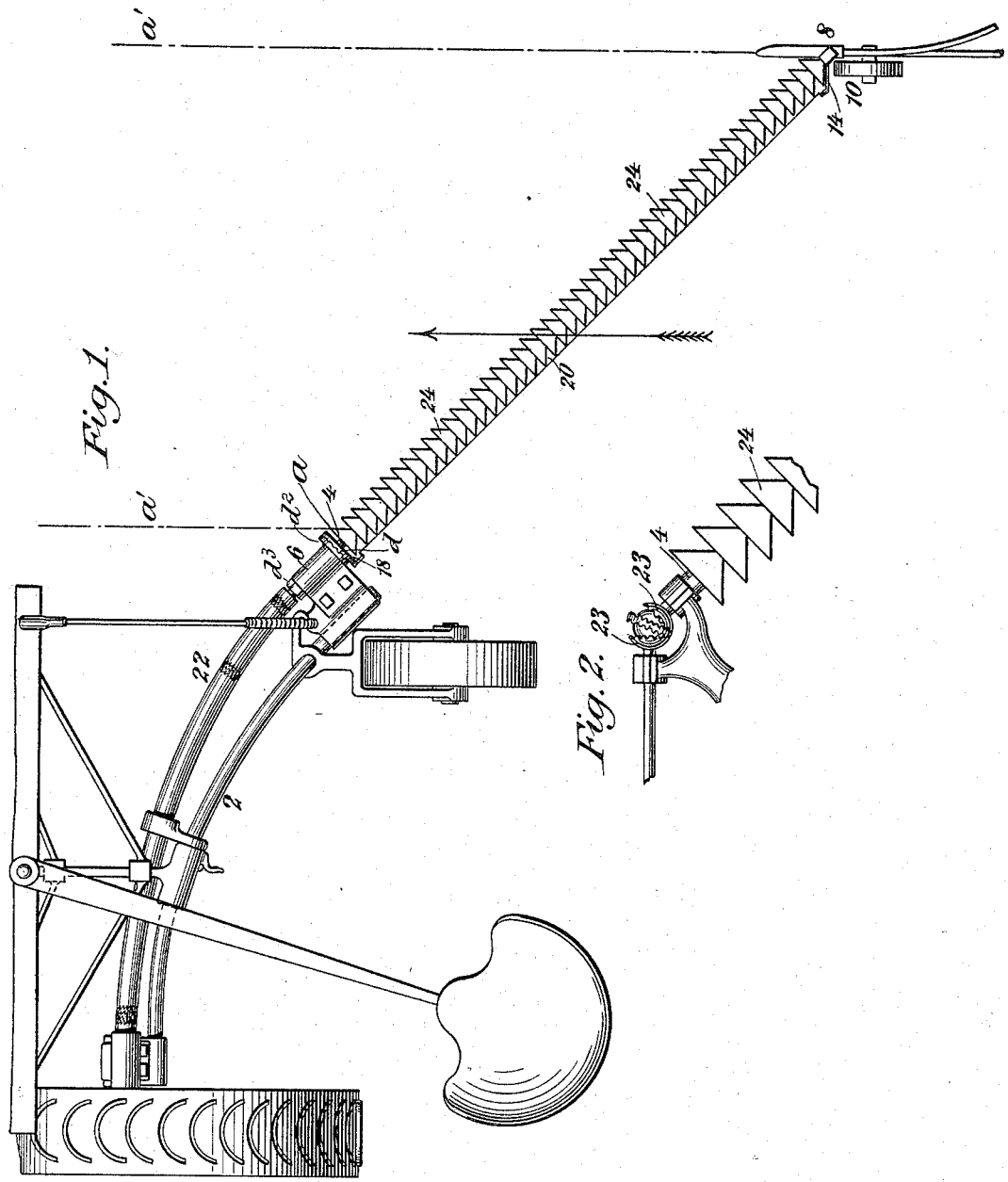
WITNESSES:
D. H. Hayworth
Eugene Lucas
INVENTOR
Gerard Beekman
BY
Henry F. Parker.
ATTORNEY

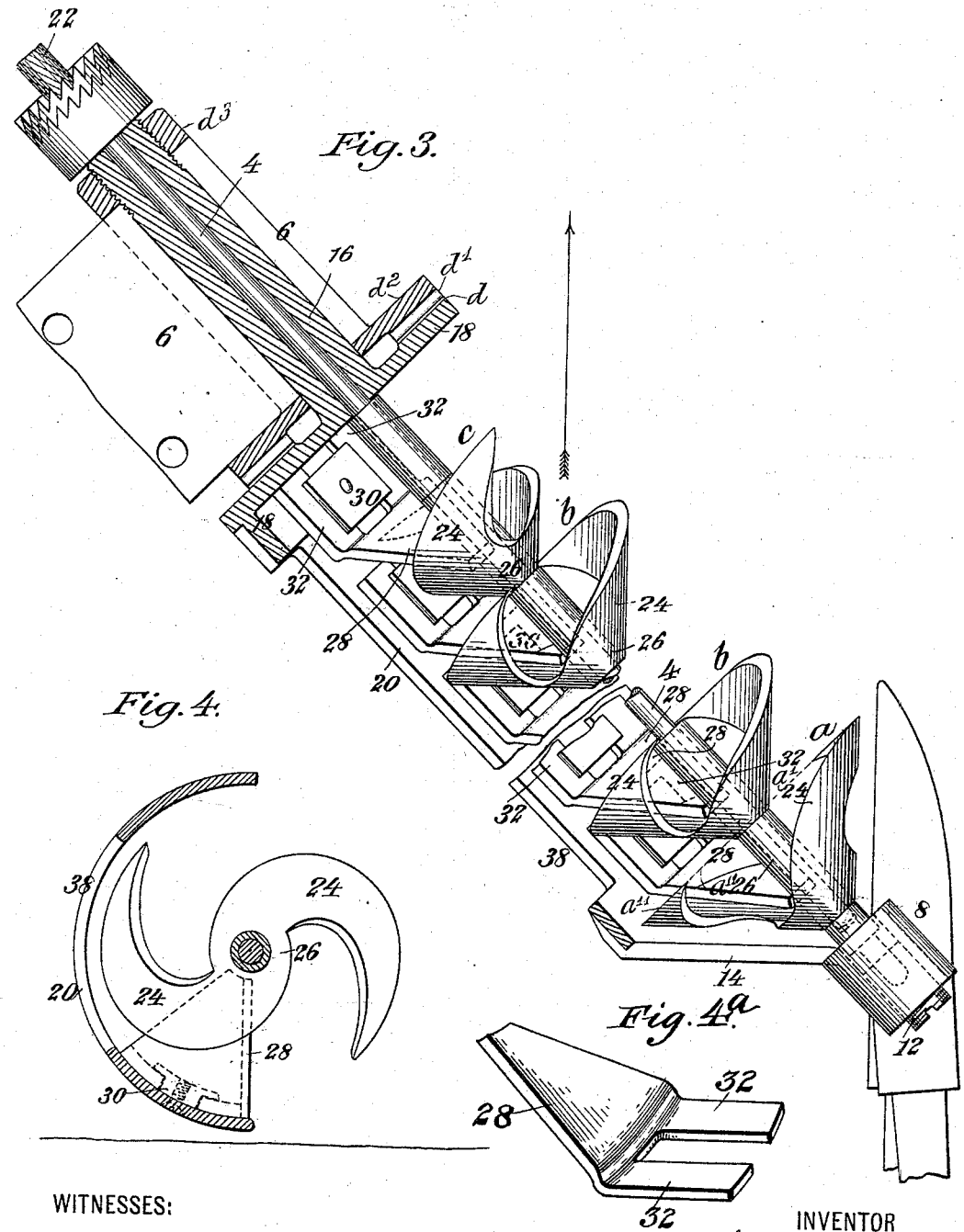

(No Model.) 3 Sheets—Sheet 3.

G. BEEKMAN.
REAPING OR MOWING MACHINE.

No. 535,883. Patented Mar. 19, 1895.

WITNESSES:
D. H. Hayward
Eugene Lucas

INVENTOR
Gerard Beekman
BY
Henry F. Parker
ATTORNEY

UNITED STATES PATENT OFFICE.

GERARD BEEKMAN, OF NEW YORK, N. Y.

REAPING OR MOWING MACHINE.

SPECIFICATION forming part of Letters Patent No. 535,883, dated March 19, 1895.

Application filed March 29, 1893. Serial No. 468,225. (No model.)

*To all whom it may concern:*

Be it known that I, GERARD BEEKMAN, a citizen of the United States, residing in the city, county, and State of New York, have invented certain new and useful Improvements in Reaping or Mowing Machines, of which the following is a specification.

The invention relates to that class of reaping or mowing machines having a cutter continuously rotating on a horizontal axis, and the object of the invention is to adapt such character of cutter to harvesting grain or cutting grass, by the feeding of the grain or grass within the cutting edges of the rotary cutter by the forward or draft movement of the machine.

The invention consists in a series of cutters rotating in vertical planes and having their axis at an angle to the line of forward or draft movement of the machine, their cutting edges being thus arranged each on one side of and behind the other in echelon; and said invention further consists in certain novel details of construction hereinafter described and claimed.

In Patents Nos. 490,781 and 490,782, granted to me under date of January 31, 1893, I have shown cutters similar to the forms of cutters shown herein but in said patents the axes of the cutters are shown as substantially at right angles to the line of forward or draft movement of the machine and a portion of one cutter extended into the line of rotary motion of another cutter, whereby the grain or grass is laterally fed from one rotary cutter to another into the rotary path of each cutting edge when advancing through the grain or grass. In the present invention however while there may be a slight lateral feed of the grain or grass from the rear or feeding side of one cutter to the cutting edge of the adjacent cutter or of the grain or grass along the angular side of the common shaft the object sought is the moving of the grain or grass into the path of the cutting edges of the knives with the least possible touching of or bending of the grain or grass.

Figure 5:
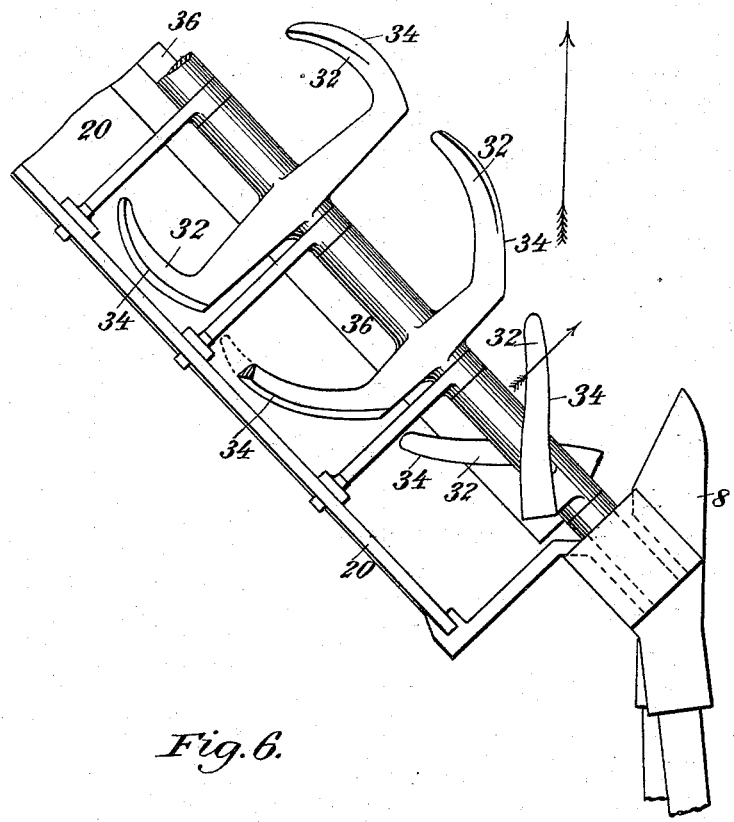
Figure 6:
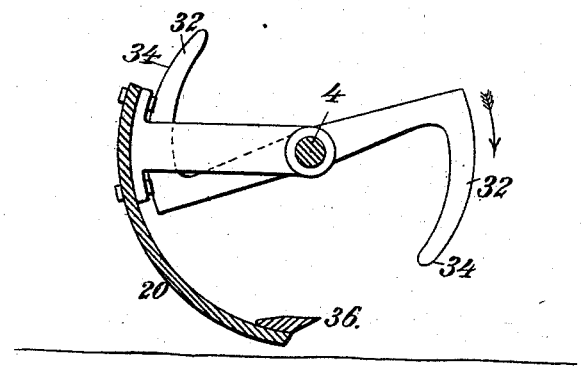

In the accompanying drawings: Figure 1, is a plan view showing assembled cutters and adjacent parts. Fig. 2, is a partial view, enlarged, showing a modification of gearing. Fig. 3, is a partial plan view further enlarged showing the cutters in detail. Fig. 4, is an end view of a cutter and a stationary knife of Fig. 3. Fig. 4$^a$ is a detail view of one of the stationary cutters in Fig. 3, shown in perspective. Fig. 5, is a plan view of a modification, and Fig. 6, is an end view thereof.

Referring by reference characters to the drawings, 2 designates a portion of the frame of a machine for moving the cutter over the ground, and 4 indicates a rotary cutter bearing shaft having a bearing 6 at its inner end attached to the machine frame and at its outer end the shaft 4 has a bearing in a shoe 8, which may be provided with a roller or wheel 10 adapted to bear upon the ground and support the shoe and outer end of the cutter bearing shaft.

The bearing in the shoe 8, consists of a block 12, longitudinally adjustable in the hollow hub of a segment plate 14. For the purpose of adjustment I have shown the block 12, as externally threaded to engage an internal thread of the hub.

A non-rotary sleeve 16 surrounds the inner end of the shaft 4, and a flanged segment plate 18 is secured to the outer end of this sleeve 16.

A transversely curved plate 20 has one end secured to the flange plate 14, and its other to the segment plate 18. This curved plate serves to maintain the outer bearing of the rotary shaft, in proper alignment with the inner bearing; as a guard for the cutters and as a support for the stationary knives hereinafter described.

The rotary cutter bearing shaft is arranged at an angle to the line of movement or draft of the machine and rotary motion is imparted thereto from the ordinary driving gear, not shown, through the medium of a flexible or curved shaft 22, Fig. 1, or through beveled gears 23, Fig. 2.

24 indicates the rotary cutters mounted on the shaft 4. I have shown each cutter mounted on a hub 26 which is suitably keyed to the shaft 4. The cutters 24, shown in Fig. 3, form sickle like hooks having helical cutting edges on their inner sides. The curvature of the cutting edge is gradual at the extremity of the cutter and of diminishing radius toward the hub 26.

28 shows the stationary knives removably mounted on the curved plate 20. For the purpose of securing the knives to the plate I provide the plate on its inner side with a rib or bar 30 having under-cut edges and each knife 28, has plate like stems 32 (Fig. 4ᵃ) adapted to engage the rib or bar 30 within the undercut edges.

The curvature of the stationary knives corresponds to the curvature of the cutters 24 and the knives have cutting edges that lie in the path of the orbit described by the cutting edges of the rotary cutters. In the example described the cutters revolve within the surface of an imaginary cone and the base of one cone is substantially on a transverse plane with the apex of an adjacent cone, and it will be seen in each example of my improvement that the cutters rotate on an angle relatively to the forward or draft movement, of about forty-five degrees.

In the example shown in Figs. 5 and 6 the rotary cutters comprise fingers 32 extended from a hub mounted on the shaft 4, as before described. The fingers 32 extend from opposite sides of a hub and all the fingers extend in one direction, and when in motion rotate within the lines of an imaginary cylinder. In this example the fingers 32 have cutting edges 34 which co-act with knife edged plate 36 affixed to the lower edge of the curved plate 20. The plate 20 may have a longitudinal opening 38 (Fig. 4) which will allow the discharge of dirt or other matter that might otherwise lodge in the plate.

The plate 20 may be adjusted in a rotary direction for the purpose of setting the knives carried thereby in any desired relation to the rotary cutters, and as a means for securing the plate as adjusted I provide the flange plate 18, with an annular series of teeth $d$, designed to interlock with a similar series of teeth $d'$, on a flange $d^2$, on the bearing 6.

The sleeve 16, is screw threaded at its inner end and a nut $d^3$, is applied thereto. When it is desired to adjust the plate 20, the nut $d^3$, is loosened sufficiently to allow a longitudinal movement of the sleeve 16, and the parts supported thereby, to disengage the teeth $d, d'$. Then the plate may be rotated as desired and upon tightening the nut $d^3$, the teeth will be caused to engage and lock the parts.

The operation of the machine is as follows: The angle of the common axis of the rotary cutters to the angle of the draft of the machine, bears such relation to the angle of the conic cutters or spiral fingers as that the conic cutters or spiral fingers shall enter the grain or grass as near as possible upon the line of passage of the machine through the grain or grass or plane of least resistance. Taking for an example Fig. 3, the lower right hand conic cutter $a$ is supposed to be entering the grain or grass in such plane of least resistance. The angle of the common shaft and of the conic cutters are each forty-five degrees. The point $a$, is about entering the grain or grass from above and passing downward to the left along the line $a', a''$, thus gathering the grain or grass after the manner of the down cut of a sickle; the grain or grass being cut against a stationary cutting knife 28 Fig. 4. The action of this conic knife, $a$, is shown by letters $b, c$, respectively in its advance in Fig 3. In the example of the spiral fingers Fig. 5, these fingers must lie within the plane of least resistance of the line of the passage of the machine through the grain or grass; and they successively hook the grain or grass cutting it off against the straight edge 36, Fig. 6. The successive action of these fingers is shown in Fig. 5.

It will be obvious that the conic knives or spiral fingers need not necessarily lie the one within the other so that the grain or grass shall be fed along the back of the one within the cutting edge of the other, without bending the same, for by separating the conic knives or spiral fingers so that they shall lie without each other, the grain or grass will be fed within the cutting edges respectively by contact with and by sliding along the front of the inclined common shaft.

It is to be understood that my invention does not rely upon any particular form of cutter, excepting of course that rotary cutters be employed.

Having described my invention, what I claim is—

1. In a reaping or mowing machine, rotary cutters rotating in vertical planes and having their axes at an angle other than a right angle to the line of draft or forward movement.

2. In a reaping or mowing machine, a series of rotary cutters upon a common axis trailing at an angle outward and rearward from the machine, and means for rotating the cutters.

3. In a reaping or mowing machine, the combination with a frame and driving mechanism, of a rotary cutter bearing shaft arranged at an angle to the line of movement of the machine, a flexible shaft between said driving mechanism and said cutter bearing shaft, a series of cutters mounted on said rotary shaft and stationary knives, substantially as specified.

4. In a reaping or mowing machine, the combination with a series of rotary cutters, of a curved guard-plate partly surrounding and inclosing said cutters, and having secured thereon a series of independently-removable, stationary cutters adapted to co-operate with said rotary cutters, the said stationary cutters each being adjustable with relation to its fellow rotary cutter in a direction longitudinally of the guard-plate, substantially as set forth.

5. In a reaping or mowing machine, the combination with a series of rotary cutters, of a series of stationary cutters adapted to co-operate therewith, and a support whereon the stationary cutters are secured, the said support being revolubly adjustable about the axis of the rotary cutters, a fixed part borne by the wheels of the carriage of the machine having a flange around the axis of the rotary cutters at one end, a movable adjacent flange around said axis attached to the inner end of the adjustable support for the stationary cutters, and means for clamping said flanges together at different positions of adjustment, the outer end of the support for the stationary cutters being independent of the said fixed part borne by the wheels of the carriage, and carried by a shoe, substantially as and for the purposes set forth.

GERARD BEEKMAN.

Witnesses:
 EUGENE LUCAS,
 HENRY F. PARKER.